United States Patent
Heckert et al.

(10) Patent No.: US 9,658,018 B1
(45) Date of Patent: May 23, 2017

(54) AIRGUN HAVING INTEGRATED SOUND SUPPRESSOR

(71) Applicant: Crosman Corporation, Bloomfield, NY (US)

(72) Inventors: Justin Daniel Heckert, Rochester, NY (US); Raymond J. Stein, Canandaigua, NY (US)

(73) Assignee: Crosman Corporation, Bloomfield, NY (US)

( * ) Notice: Subject to any disclaimer, the term of this patent is extended or adjusted under 35 U.S.C. 154(b) by 0 days.

(21) Appl. No.: 15/079,745

(22) Filed: Mar. 24, 2016

(51) Int. Cl.
*F41A 21/30* (2006.01)
*B29C 45/14* (2006.01)
*B29L 31/00* (2006.01)

(52) U.S. Cl.
CPC ........ *F41A 21/30* (2013.01); *B29C 45/14622* (2013.01); *B29C 45/14639* (2013.01); *B29L 2031/777* (2013.01)

(58) Field of Classification Search
CPC .............. F41A 21/30; B29C 45/14622; B29C 45/14639; B29L 2031/777
USPC .......................................... 89/14.4; 181/223
See application file for complete search history.

(56) References Cited

U.S. PATENT DOCUMENTS

| | | | |
|---|---|---|---|
| 3,399,597 A * | 9/1968 | Perrine | F41A 21/30 181/223 |
| 4,974,489 A | 12/1990 | Fishbaugh | |
| 5,315,914 A * | 5/1994 | Schumacher | F41A 21/30 89/14.05 |
| 7,032,339 B1 * | 4/2006 | Bounds | F41A 21/36 42/1.06 |
| 7,874,238 B2 | 1/2011 | Silvers | |
| 8,162,100 B2 * | 4/2012 | Shults | F41A 21/30 181/223 |
| 8,261,651 B2 * | 9/2012 | Casas Salva | F41A 21/02 181/223 |
| 8,978,818 B2 | 3/2015 | Proske | |
| 2014/0076658 A1 | 3/2014 | Smith, II et al. | |
| 2014/0157640 A1 * | 6/2014 | Whelan | F41A 21/30 42/75.02 |
| 2014/0190345 A1 | 7/2014 | Daniel et al. | |
| 2014/0374189 A1 | 12/2014 | Young et al. | |
| 2015/0041246 A1 | 2/2015 | Coley | |
| 2015/0090105 A1 * | 4/2015 | Pace | F41A 21/30 89/14.4 |

* cited by examiner

*Primary Examiner* — Forrest M Phillips
(74) *Attorney, Agent, or Firm* — Brian B. Shaw, Esq.; Harter Secrest & Emery LLP

(57) ABSTRACT

An airgun having an integrated sound suppressor with a baffle stack and barrel receiving section overmolded to a length of a barrel is provided. A shroud is disposed about a portion of the baffle stack having at least one baffle to enclose expansion gaps defined by adjacent baffles within the baffle stack.

20 Claims, 6 Drawing Sheets

FIGURE 4
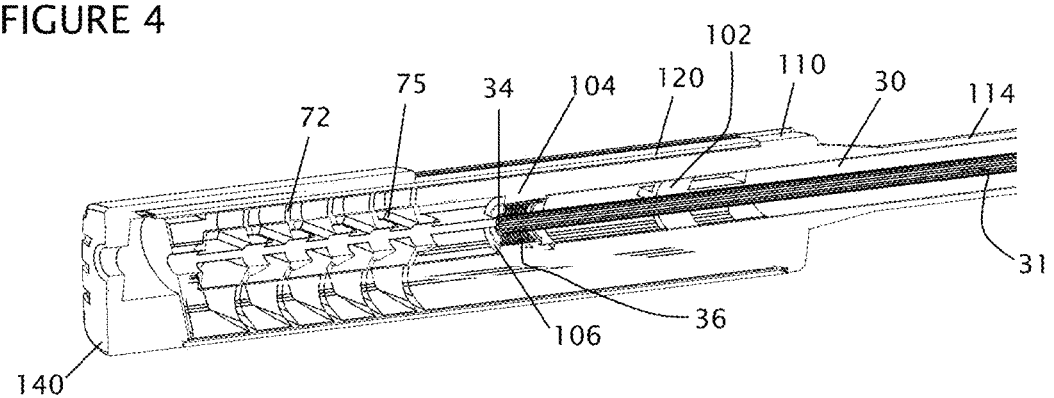
FIGURE 5
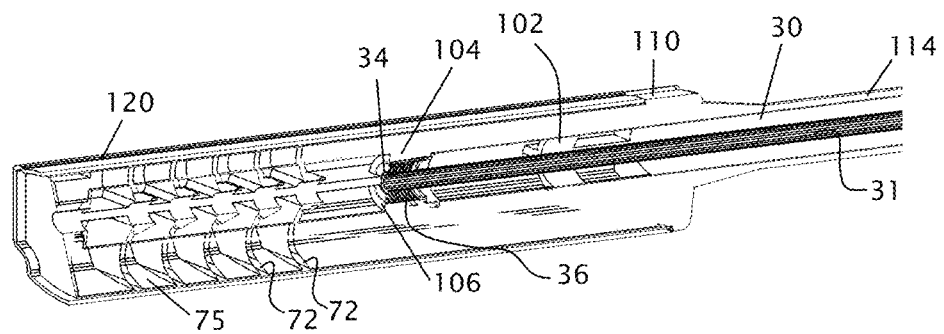
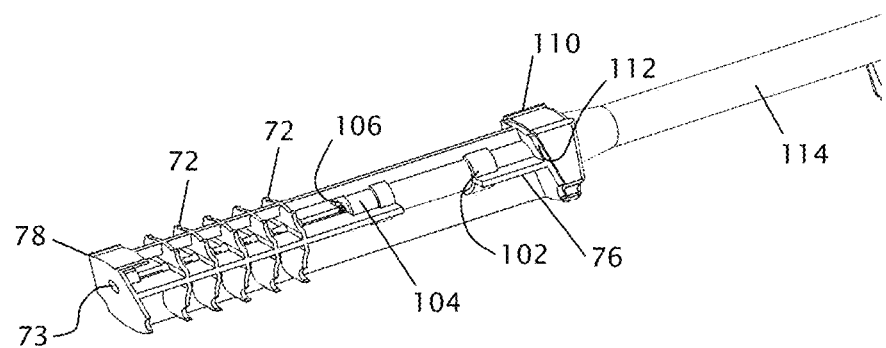
FIGURE 6

FIGURE 7
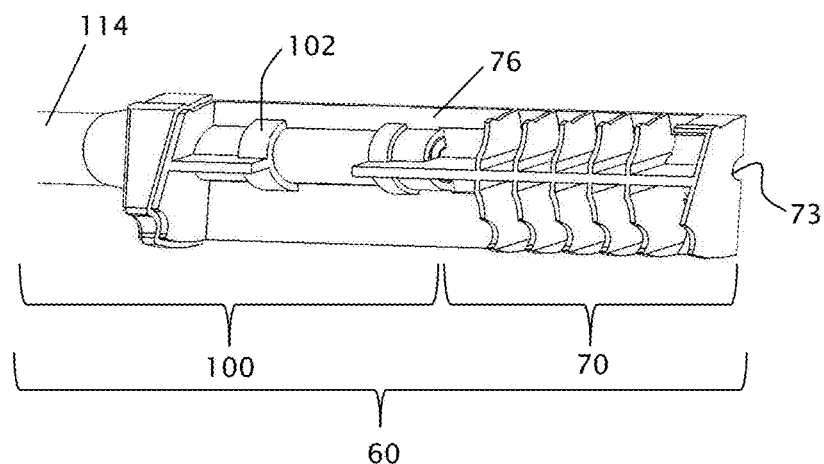
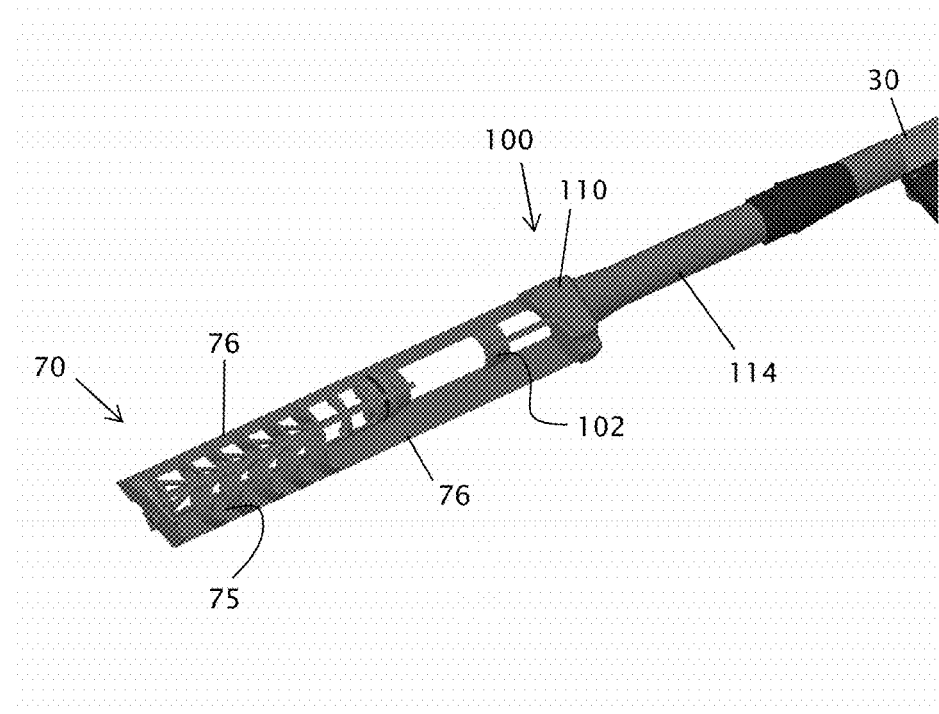
FIGURE 8

FIGURE 9
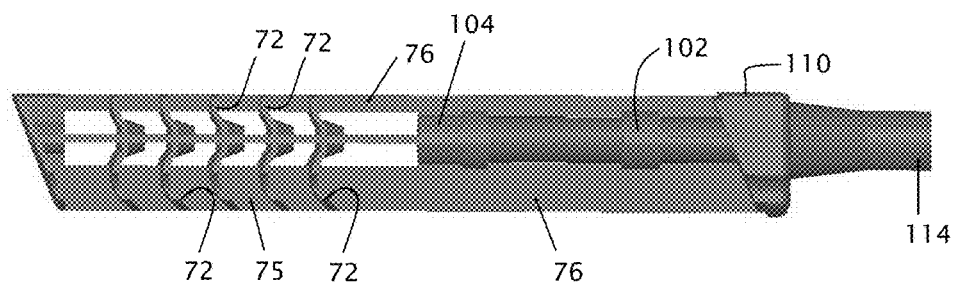
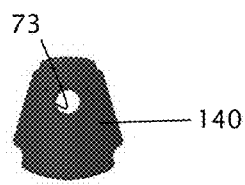
FIGURE 10
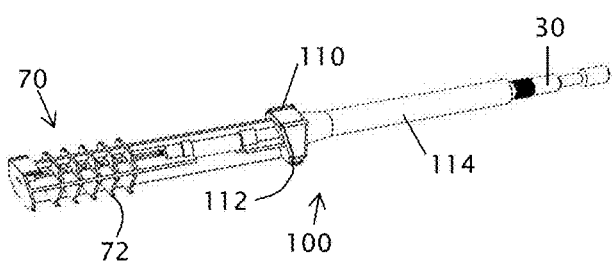
FIGURE 11

AIRGUN HAVING INTEGRATED SOUND SUPPRESSOR

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

Field of the Invention

The present disclosure relates to airguns and particularly to an airgun with an integrated sound suppressor.

Description of Related Art

Suppressors for firearms, also known as silencers, generally operate to reduce the audible noise or sharp report of a firing weapon by means of reducing and controlling the energy level of the propellant gases. Generally, the techniques employed utilize a series of baffles which control and delay the flow, expansion, and exiting of propellant gases, forcing the propellant gases to pass through various temperature absorbent materials, or a combination of these or functionally similar techniques to reduce the temperature and abrupt discharge of propellant gases.

Traditionally, silencers (also referred to as suppressors) have been built with an outer tube and internal baffling components. The outer tube is steel or aluminum tubing and has end caps threaded in place. The internal components are typically a set of flat disks each having a hole through the center thereof with spacers there between to create a volume of space (referred to as a baffle chamber) between each set of disks. An alternative to the flat spacer configuration includes various shaped baffles that are either machined or stamped.

However, the need exists for a lightweight and durable sound suppressor for an airgun.

BRIEF SUMMARY OF THE INVENTION

In one configuration, the present disclosure provides a method of forming a barrel assembly for an airgun, including locating a portion of a barrel within a mold, the portion of the barrel including a muzzle; introducing a polymeric material into the mold to engage a portion of the barrel and form a baffle assembly having a baffle stack of at least one baffle, the at least one baffle at least partly defining a radially extending expansion gap, the expansion gap having an open end; and removing the barrel and the engaged baffle assembly from the mold.

A shroud can be engaged about the baffle stack to enclose the expansion gaps.

In a further configuration, a barrel assembly for an airgun, is provided having a barrel having a bore extending along a longitudinal axis and terminating at a muzzle; a baffle assembly having (i) at least one baffle, wherein the baffle partly defines a radially extending open ended expansion gap and (ii) a barrel receiving section sized to receive the length of the barrel and locate the muzzle within the baffle assembly and wherein the baffle assembly is molded about a length of the barrel; and a shroud engaging the baffle to close an open end of an expansion gap between adjacent baffles.

As set forth below, the present system provides for manufacturing and assembly advantages, such as compatibility with mold inserts for modifying the configuration of the baffle and baffle stack. Further, the use of the shroud and end cap provide for ready optimization of a given suppressor, such as but not limited engagement features for external equipment as well as the configuration of the shroud or end cap relative to the baffle assembly.

BRIEF DESCRIPTION OF THE SEVERAL VIEWS OF THE DRAWING(S)

FIG. 4 is a perspective cross sectional view of a portion of the present integrated sound suppressor.

FIG. 5 is a perspective cross sectional view of the portion of the present integrated sound suppressor of FIG. 4, with an end cap removed.

FIG. 6 is a perspective view of the present integrated sound suppressor with the end cap and a shroud removed.

FIG. 7 is a perspective cross sectional view of a portion of the present integrated sound suppressor.

FIG. 8 is a perspective cross sectional view of a portion of the present integrated sound suppressor.

FIG. 9 is a side elevational view the present integrated sound suppressor with the end cap and the shroud removed.

FIG. 10 is an end elevational view of the present integrated sound suppressor showing the end cap.

FIG. 11 is a perspective view of a barrel assembly having the baffle assembly and the barrel, with the end cap and the shroud removed.

DETAILED DESCRIPTION OF THE INVENTION

Figure 1:
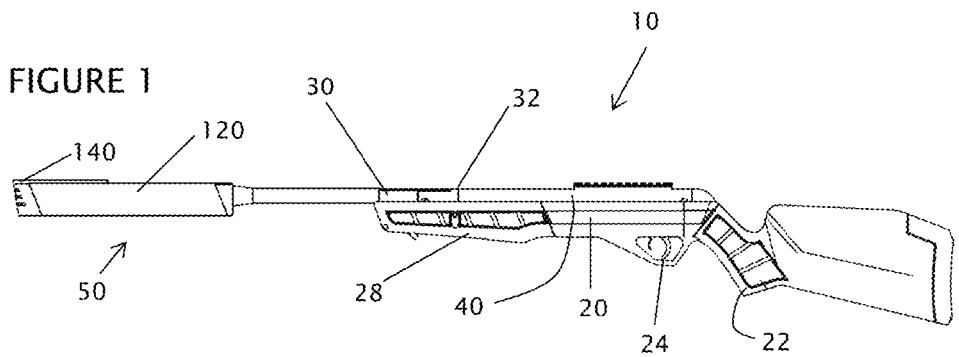
FIG. 1 is a side elevational view of an airgun having the present integrated sound suppressor.
Figure 2:
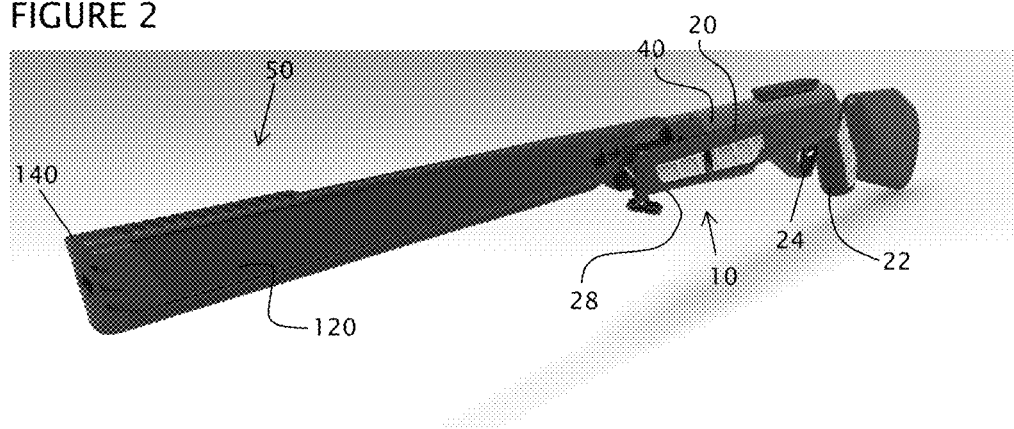
FIG. 2 is a perspective view of an airgun having the present integrated sound suppressor.

Referring to FIGS. 1 and 2, a representative airgun 10 is shown incorporating a sound suppressor 50.

The term airgun includes, but is not limited to a projectile launching weapon using a hollow, tubular barrel with a closable end for directing a projectile along the barrel to exit along a trajectory.

Although the present description is set forth in terms of a given airgun 10, the integrated sound suppressor 50 is not limited to the particular configuration of the airgun, other than the airgun having a barrel.

As seen in FIGS. 1 and 2, in one configuration, the airgun 10 includes a main frame (or stock) 20, a grip 22, a trigger 24, a barrel 30, and a pressure generator 40. A motive gas is selectively passed from the pressure generator 40 to the barrel 30 in response to actuation of the trigger. In selected configurations, the airgun 10 can also include a foregrip 28.

The main frame (stock) 20 can be formed of halves or upper and lower portions, as known in the art as well as a substantially one piece molded or wooden construction. The main frame 20 is constructed to retain and operably locate the remaining components. The grip 22 can be separately constructed or integral with the main frame 20.

The pressure generator 40 can be any of a variety of mechanisms for providing a supply of pressurized or relatively high pressure gas to the barrel as the motive gas. For example, the pressure generator 40 can be one of a reservoir retaining a volume of compressed gas, a compressed gas, a fan including a propeller or an impeller as well as a spring actuated piston, wherein the spring can be a metal coil spring or a gas spring as known in the art.

The barrel 30 is an elongate tube having a bore 31 extending along a longitudinal axis from a fork 32, at a breech for introducing a projectile into the bore, to a muzzle 34, a terminal end from which the projectile passes from the barrel. The bore 31 is sized for passing a projectile of a predetermined size. Thus, the barrel 30 can be any of a variety of calibers.

The sound suppressor 50 includes a baffle assembly 60, a shroud 120 and optional end cap 140.

Referring to FIG. 7, the baffle assembly 60 includes a baffle stack 70 and a barrel receiving section 100.

The baffle stack 70 includes at least one baffle 72. The baffle stack 70 can include from 1 to 10 or more baffles 72, depending on the intended configuration of the airgun 10. For purposes of description, the baffle stack 70 is set forth as having a plurality of baffles 72, however it is understood the baffle stack can include a single baffle. The baffles 72 can have a circular or non-circular periphery. That is, the periphery of the baffles can be obround, oval, square, curvilinear, rectangular or multifaceted. As seen in FIG. 10, the periphery of the baffles 72 can be multifaceted, curvilinear or a combination. The baffles 72 includes a through hole 73 aligned with the longitudinal axis of the bore 31 of the barrel 30. The through holes 73 are sized to pass the projectile passing from the bore 31, without interference.

The generally annular gap adjacent to a baffle 72 or between adjacent baffles substantially defines an expansion gap 75. The expansion gap 75 is sized to receive the expanding motive gas having passed from the muzzle 34 of the barrel 30. By allowing a portion of the expanding motive gas to expand, the sound suppressor reduces the normal crack or pop associated with the expansion of a larger volume of gas.

While the baffles 72 are shown as substantially identical elements, it is understood the shape and profile of individual baffles vary along the longitudinal axis (baffle stack 70). Thus, the radial dimension (and hence volume) of the expansion gaps 75 can vary along the longitudinal axis. That is, the sound suppressor 50 can have a portion extending along the longitudinal axis that has a greater periphery or radial dimension than an adjacent portion of the sound suppressor along the longitudinal axis. In addition, the spacing of the baffles 72 along the longitudinal axis can be varied to vary the volume of the radially extending expansion gap 75 along the longitudinal axis.

Typically, as the least two adjacent baffles 72 at least partly define the radially extending expansion gap 75 therebetween, the expansion gap has an open end or annulus radially spaced from the longitudinal axis. Alternatively in the single baffle configuration, the single baffle 72, partly defines the expansion gap 75 as extending from the longitudinal axis to the periphery of the baffle. As set forth below, the open annulus of the expansion gap 75 can be closed by the shroud 120.

A cross section of the baffles 72 taken along the longitudinal axis can have any of a variety of profiles such as, but not limited to curvilinear or multi-faceted, such as "M" or "K", wherein adjacent facets define an inflection point.

In one configuration, a terminal baffle 72' is formed at the terminal end of the baffle stack 70, wherein the terminal baffle includes an engaging surface 78 for engaging the shroud 120.

While it is contemplated the baffles 72 can be concentric about the longitudinal axis of the barrel 30, it is understood as seen in FIGS. 3, 4, 5, 6, 7 and 10, the baffles 72 (or a periphery of the baffles) can be eccentrically located with respect to the longitudinal axis. That is, the through holes 73 of the baffles 72 can be located to space the geometric center of the baffle 72 from the longitudinal axis.

The baffle stack 70 can include at least one or a plurality of longitudinally extending reinforcing struts 76. In one configuration, the baffle stack 70 includes four reinforcing struts 76, wherein the struts are symmetrically located about a circumference concentric with the longitudinal axis. The reinforcing struts 76 extend generally parallel to the longitudinal axis and interconnect the individual baffles 72 to define the baffle stack 70.

In one configuration, the reinforcing struts 76 extend from the baffle stack 70 to the barrel receiving section 100.

The barrel receiving section 100 is sized to receive the length of the barrel 30 and locate the muzzle 34 within the baffle assembly 60 and wherein the baffle assembly is molded about a length of the barrel. The barrel receiving section 100 can be immediately bonded to or engaged with an outer surface of the barrel 30. Alternatively, an intermediate layer or material can be disposed between the barrel receiving section 100 of the baffle assembly 60 and the outer surface of the barrel 30.

Figure 3:
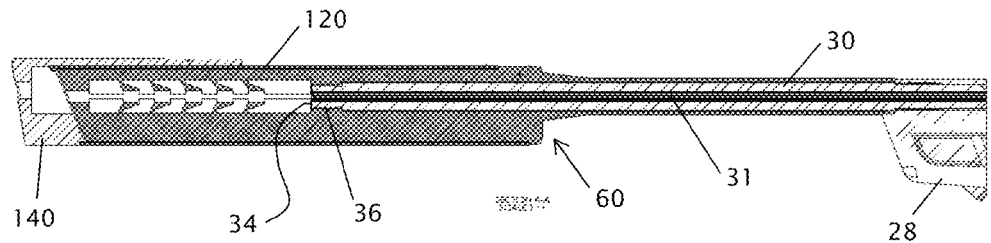
FIG. 3 is a cross sectional view of a portion of the present integrated sound suppressor.

Referring to FIGS. 3-5, a portion or surface of the barrel 30 can include engaging surfaces 36 for engaging the material of the baffle assembly 60 and particularly the barrel receiving section 100. The engaging surfaces 36 can include the threads as shown in the Figures as well as grooves, knurls, flats or surfaces for increasing a retention force between the barrel 30 and the baffle assembly 60. The engaging surfaces 36 can include from one to a plurality of areas that extend about a periphery or a portion of the periphery of the outer surface of the barrel 30. That is, the engaging surfaces 36 can be continuous about the periphery or can have gaps. The engaging surfaces 36 can be located anywhere along the barrel 30 intermediate the muzzle 34 and the base 110. As seen in FIGS. 3-5, the engaging surfaces 36 can include a plurality of threads about the periphery of the barrel 30 adjacent the muzzle 34.

As seen in FIGS. 4-8, the barrel receiving section 100 can include retaining bands 102 and a base 110, as well as the reinforcing struts 76.

The barrel receiving section 100 can extend from the muzzle 34 to the stock or from the muzzle to along a portion of the barrel 30, wherein the barrel receiving section extends along the barrel a length of at least the longitudinal dimension of the baffle stack 70.

The base 110 can be located adjacent the stock or intermediate the muzzle and the stock 20 as seen in FIGS. 3-7. In one configuration, the base 110 defines an engaging surface 112, such as a shoulder for engaging the shroud 120. The base 110 can define a periphery that is coincident with baffles 72 or at least the nearest baffle. Alternatively, depending on the configuration of the shroud 120, the base 110 can have a periphery that is larger or smaller than the baffle stack 70.

The shroud 120 can include a variety of mount mechanisms for engaging ancillary equipment. For example, the shroud 120 can include a rail, such as but not limited to a dovetail, Weaver or Picatinny rail as well as non rail mounts such as but not limited to snaps, guides, levers, catches, magnets, interference fits, threaded engagements and cams.

The retaining bands 102 extend about a periphery of the outer surface of the barrel 30. The retaining bands 102 can be continuous about the periphery or can have gaps. The retaining bands 102 can be located intermediate the muzzle 34 and the base 110. Further, the retaining bands 102 can coincide with the engagement surfaces 36, wherein each retaining band engages an engaging surface or a subset of the retaining bands engages an engaging surface. As seen in FIGS. 4-7 and 9, the retaining bands 102 can include a muzzle retaining ring 104 which extends about the periphery of the barrel 30 adjacent the muzzle 34 and includes a retaining lip 106 extending radially inward to terminate within the radial thickness of the barrel.

Figure 13:
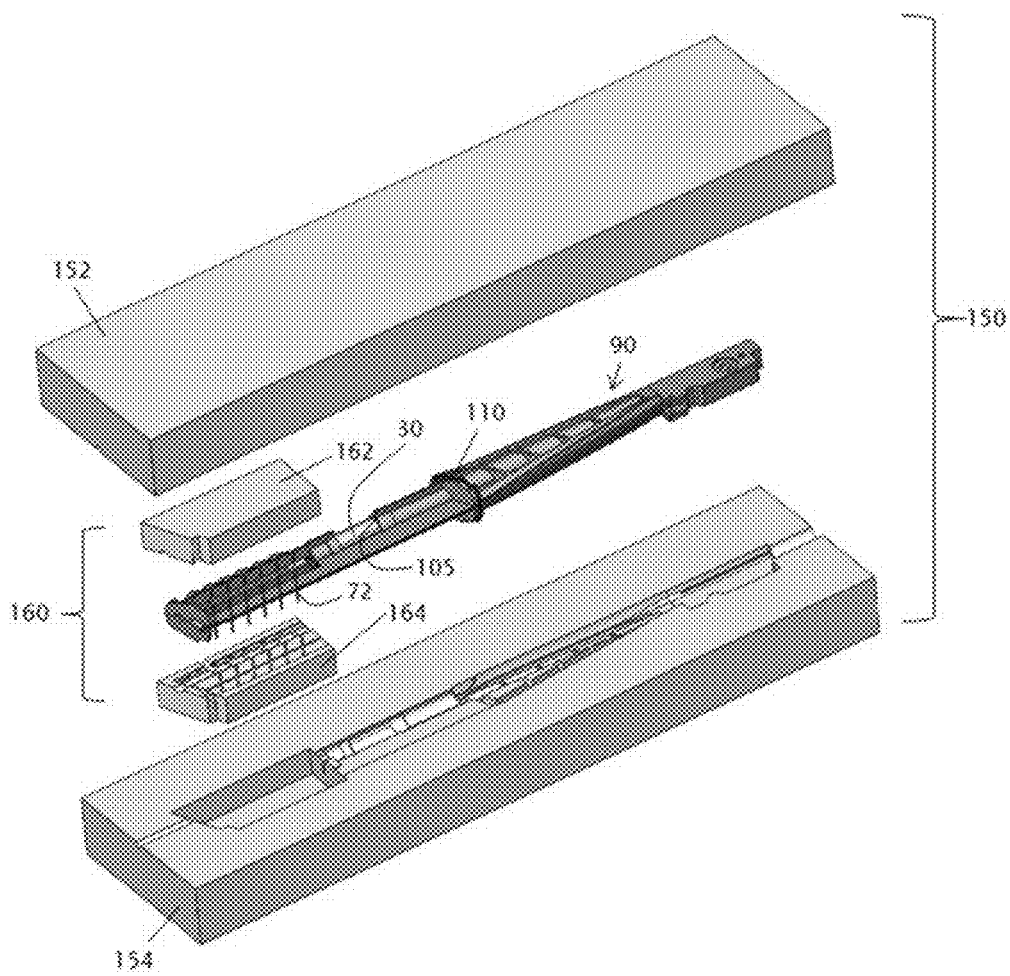
FIG. 13 is a representative view of a mold and insert relative to a barrel for forming the baffle assembly.

Referring to FIG. 13, during formation, the material, such as elastomers, thermoplastics, thermosets, thermoplastic vulcanizates or thermoplastic elastomers, injected into a mold 150 to form the baffle assembly 60 cools and shrinks to engage the barrel 30 and particularly the engaging surfaces 36. The engagement of the material of the baffle assembly 60 and the engaging surfaces 36 precludes movement of the baffle assembly along the longitudinal axis. That is, the baffle assembly 60 is effectively affixed to the barrel 30 to form an integral unit. Alternatively, it is contemplated the baffle assembly can be bonded or fastened to the barrel 30 such as by pins or fasteners.

Further, as set forth below the retaining bands 102 of the barrel receiving portion 100 are longitudinally spaced along the barrel 30 so as to define exposed portions of, or a window 105 (seen in FIG. 13) to the surface of the barrel. These exposed portions provide for registration of the barrel within the mold. That is, the windows in the baffle assembly 60 exposing the outside surface of the barrel 30 permit the barrel to be operably registered with the mold during formation of the baffle assembly.

The barrel receiving section 100 can also define a sleeve portion 114, wherein the sleeve portion extends substantially along the outer surface of the barrel 30 from the base 110 toward or to the breech 32. In one configuration, the sleeve portion 114 includes surface texture such as knurls or ridges to facilitate a grip on the sleeve portion.

As seen in FIGS. 4-9, a first pair of opposing reinforcing struts 76 can extend from the terminal end of the sound suppressor 50 to the base 110 and a second pair of opposing struts 76 extend from the terminal end of the sound suppressor to the retaining ring 102 nearest the muzzle 34, such as the muzzle retaining ring 104.

In the radial direction, the reinforcing struts 76 can extend from the periphery of the baffle stack 70 toward the longitudinal axis, wherein an inner surface of the reinforcing struts is sufficiently spaced from the longitudinal axis to permit unobstructed passage of the projectile along the longitudinal axis.

It is further contemplated that certain configurations of the integrated sound suppressor 50 can include the end cap 140 sized to receive the terminal end of the baffle stack 70 and the shroud 120. The end cap 140 can be a friction fit, mechanically secured or bonded to the baffle assembly 60 and the shroud 120 to preclude or permit non-destructive separation. That is, the end cap 140 can be glued, pinned or fastened to the baffle assembly 60 and/or the shroud 120.

In one configuration, the baffle assembly 60 is molded about the barrel 30 to form a barrel assembly. In such process, the muzzle 34 and a length of the barrel 30 are disposed in the mold 150, wherein a mold plug is then moved along the longitudinal axis to be partly received within the bore 31. As seen in FIG. 13, the mold 150 can be defined by mold halves 152, 154 which move perpendicular to the longitudinal axis. That is, the draft of the mold 150 extends perpendicular to the longitudinal axis. Thus, the mold halves 152, 154 can be translated perpendicular to the longitudinal axis to define a mold cavity, wherein the mold cavity can retain an insert 160 defining the shape of the particular baffle or baffle stack. By changing the insert 160, the baffle assembly 60 can be readily changed between barrels or different runs with the same size barrel.

Referring to FIG. 13, the mold 150, having mold halves 152 and 154, in conjunction with the insert 160, having insert halves 162 and 164, defines the mold cavity representing a barrel assembly 90. As the inserts 162, 164 define the particular configuration of the baffle assembly 60, by providing alternative configurations of the inserts, various configurations of the baffle assembly can be formed without requiring any modification of the mold halves 152, 154.

Figure 12:
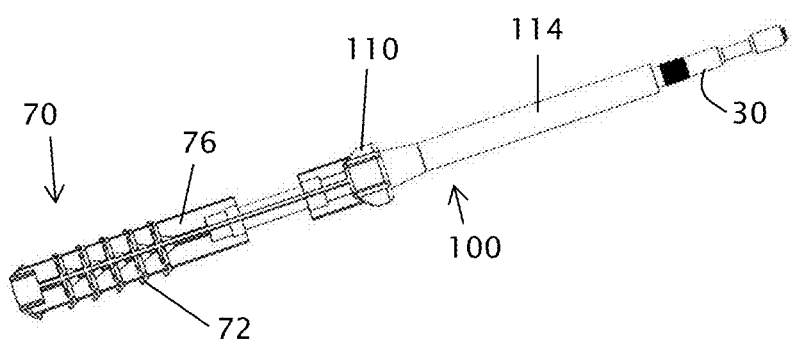
FIG. 12 is a top plan view of the barrel assembly of FIG. 11.

Thus, the molds defining the barrel assembly 90 with the particular baffle assembly 60 are then disposed about the barrel 30, a plug disposed in the bore 31, wherein the window 105 is used to register the mold 150 to the barrel and the plug is disposed within the bore 31. The polymeric resin is then introduced into the molds. Typically, the resin is bonded directly to the outer surface of the barrel 30, however it is understood an intermediate material can be disposed between the resin and the outer surface while still providing the recited integral connection. Upon sufficient cooling, the barrel assembly 90 of FIGS. 11-13 is removed from the molds and is thus provided. That is, the barrel assembly 90 includes the barrel 30, the baffle stack 70 and the barrel receiving section 100.

The sound suppressor 50 is completed by engaging the shroud 120 to the formed barrel assembly 90. As seen FIGS. 1-5, the shroud 120 is disposed about the periphery of the baffle stack 70 between the base 110 and terminal baffle and engages the engaging surface of the baffle stack 70 and the engaging surface 112 of the base.

In one configuration, the shroud 120 closes the radially open end of the expansion gap 75 between adjacent baffles 72. Thus, the expansion gap 75 is substantially defined by adjacent baffles 72 and a portion of the shroud 120.

The shroud 120 can be formed of the same material as the baffle stack 70. However, it is understood the shroud 120 can be of a different material. Similarly, the shroud 120 can be the same, a complimentary or a contrasting color to the baffle assembly 60, including the barrel receiving section 100.

The present disclosure thus provides a barrel assembly 90 having the barrel 30, the baffle stack 70 and the barrel receiving section 100, wherein the baffle stack and barrel receiving portion are overmolded to the barrel. That is, the baffle assembly 60 is integrally formed about a length of the barrel 30, such that the barrel assembly 90 provides an integral construction of the barrel 30, the baffle stack 70 and the barrel receiving section 100. In one configuration, the baffle assembly 60 and the barrel 30 are sufficiently integral to preclude non-destructive separation. However, it is recognized the materials could be selected such that the baffle assembly 60 can be nondestructively removed from the barrel 30.

The shroud 120 is subsequently disposed about the formed barrel assembly 90 to enclose the expansion gaps 75 defined by adjacent baffles 72. The shroud 120 can be engaged with the barrel assembly by a variety of mechanisms, including but not limited to adhesives, bonding, mechanical engagement and interference fits as well as fasteners, such as but not limited to screws, pins, hook and loop fasteners or rivets.

It is understood the characteristics the integrated sound suppressor 50 include the number and the shape of the expansion gaps 75 and baffles 72 within the baffle stack 70. Further, as each expansion chamber 75 reduces the muzzle report by a given amount, therefore, a larger number of expansion chambers may be desirable. However, integrated sound suppressor 50 increases the total length of the airgun 10. By the present over molding and reducing the mass of material, reduced weight is added by the sound suppressor, thereby preserving balance and line of sight of the airgun 10. The present system allows the length and weight of the integrated sound suppressor 50 to be as short and light as possible.

Depending on the desired configuration of the barrel assembly 90, it is understood the mold 150 can further define a block for receiving a break bolt, such as in a break barrel style airgun. Thus, the barrel assembly 90 can include both the features for operably engaging the barrel with the receiver or stock as well as the baffle assembly 60.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method of forming a barrel assembly for an airgun, the method comprising:
   (a) locating at least a portion of a barrel within a mold, the portion of the barrel including a muzzle;
   (b) introducing a polymeric material into the mold to engage a part of the barrel and form a baffle assembly having a baffle stack of at least one baffle, the at least one baffle at least partly defining a radially extending expansion gap, the expansion gap having an open end; and
   (c) removing the barrel and the engaged baffle assembly from the mold.

2. The method of claim 1, further comprising engaging a shroud with at least a portion of the baffle stack to close the open end of the expansion gap.

3. The method of claim 1, wherein the baffle stack includes at least two baffles.

4. The method of claim 1, wherein the baffle includes an aperture aligned with the muzzle.

5. The method of claim 1, wherein the portion of the polymeric material engaging the barrel and forming the baffle stack is integral.

6. The method of claim 1, wherein the portion of the polymeric material engaging the barrel extends along a length of the barrel.

7. The method of claim 1, wherein the portion of the polymeric material engaging the barrel engages a length of the barrel.

8. The method of claim 1, wherein a periphery of the baffle is noncircular.

9. The method of claim 1, wherein a periphery of the baffle is circular.

10. The method of claim 1, wherein a periphery of the shroud is noncircular.

11. The method of claim 1, wherein a periphery of the shroud is circular.

12. The method of claim 1, wherein the introduced polymeric material defines a barrel receiving section.

13. The method of claim 12, wherein the barrel includes an engaging surface engaging the barrel receiving section to operably preclude movement of the baffle assembly along the barrel.

14. A barrel assembly for an airgun, the barrel assembly comprising:
   (a) a barrel having a bore extending along a longitudinal axis and terminating at a muzzle;
   (b) a baffle assembly having (i) at least one baffle, wherein the baffle partly defines a radially extending open ended expansion gap and (ii) a barrel receiving section sized to receive the length of the barrel and locate the muzzle within the baffle assembly and wherein the baffle assembly is molded about the length of the barrel; and
   (c) a shroud engaging the baffle to close an open end of an expansion gap.

15. The barrel assembly of claim 14, wherein at least one of the shroud and a periphery of the baffle defines a circular periphery perpendicular to the longitudinal axis.

16. The barrel assembly of claim 14, wherein at least one of the shroud and a periphery of the baffle defines a noncircular periphery perpendicular to the longitudinal axis.

17. The barrel assembly of claim 14, wherein the baffle assembly includes a plurality of baffles.

18. The barrel assembly of claim 17, wherein each baffle has an aperture aligned with the longitudinal axis.

19. The barrel assembly of claim 14, wherein the baffle assembly is an integral one piece construction.

20. The barrel assembly of claim 14, wherein a portion of the baffle assembly is formed about a length of the barrel.

* * * * *